United States Patent
Sarkar et al.

(10) Patent No.: US 12,205,126 B2
(45) Date of Patent: Jan. 21, 2025

(54) SYSTEM AND METHOD TO MONITOR RELEVANCE OF CUSTOMER'S BUSINESS RISK DUE TO MARKET CHANGES

(71) Applicant: International Business Machines Corporation, Armonk, NY (US)

(72) Inventors: Ratul Sarkar, Bangalore (IN); Ankit Kumar Singh, Ranchi (IN); Simardeep Singh Arneja, New Delhi (IN); Srinivasan S. Muthuswamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 17/197,862

(22) Filed: Mar. 10, 2021

(65) Prior Publication Data
US 2022/0292524 A1    Sep. 15, 2022

(51) Int. Cl.
*G06Q 30/0201* (2023.01)
*G06Q 40/03* (2023.01)

(52) U.S. Cl.
CPC ......... *G06Q 30/0201* (2013.01); *G06Q 40/03* (2023.01)

(58) Field of Classification Search
CPC ........................... G06Q 40/03; G06Q 30/0201
See application file for complete search history.

(56) References Cited

U.S. PATENT DOCUMENTS

| | | | |
|---|---|---|---|
| 7,634,467 B2 | 12/2009 | Ryan et al. | |
| 7,856,388 B1 | 12/2010 | Srivastava et al. | |
| 8,266,148 B2 | 9/2012 | Guha et al. | |
| 8,515,862 B2 | 8/2013 | Zhang et al. | |
| 9,208,460 B2 * | 12/2015 | Rosenburg | G06Q 10/063 |
| 9,330,376 B2 | 5/2016 | Gates | |
| 10,049,100 B2 | 8/2018 | Schilder et al. | |
| 11,972,360 B2 * | 4/2024 | Kim | G06F 40/30 |
| 2004/0024674 A1 | 2/2004 | Feldman | |

(Continued)

FOREIGN PATENT DOCUMENTS

| | | |
|---|---|---|
| CN | 108846006 A | 11/2018 |
| JP | 2005516308 A | 6/2005 |
| KR | 20180059167 A | 6/2018 |

*Primary Examiner* — Deirdre D Hatcher
(74) *Attorney, Agent, or Firm* — Scully, Scott, Murphy & Presser, P.C.

(57) ABSTRACT

A computer-implemented system, method and/or computer program product to monitor changes in business risk of a targeted entity includes retrieving one or more industry classifications for one or more core businesses of the targeted entity; receiving news feeds related to the one or more industry classifications; detecting and extracting negative news related to the core businesses of the targeted entity from the news feeds; calculating an industry confidence score based upon the negative news; determining if the industry confidence score is greater than an industry confidence threshold; calculating, in response to the industry confidence score being larger than the industry confidence threshold, an entity confidence score for the targeted entity based upon negative news; and generating, in response to the entity confidence score being larger than an entity confidence threshold, an alert report for the targeted entity.

20 Claims, 6 Drawing Sheets

(56) References Cited

U.S. PATENT DOCUMENTS

| | | | |
|---|---|---|---|
| 2008/0021803 A1* | 1/2008 | Ahles | G06Q 20/40 |
| | | | 705/45 |
| 2008/0189165 A1 | 8/2008 | An et al. | |
| 2008/0195463 A1* | 8/2008 | Aggour | G06Q 10/00 |
| | | | 707/E17.014 |
| 2009/0164387 A1* | 6/2009 | Armstrong | G06F 40/30 |
| | | | 705/37 |
| 2011/0137788 A1* | 6/2011 | Merkle | G06Q 40/02 |
| | | | 705/38 |
| 2012/0095802 A1* | 4/2012 | Wilberding | G06Q 10/0635 |
| | | | 705/7.28 |
| 2012/0221485 A1* | 8/2012 | Leidner | G06Q 40/08 |
| | | | 705/36 R |
| 2012/0290330 A1* | 11/2012 | Coleman | G06Q 40/00 |
| | | | 705/4 |
| 2013/0132269 A1* | 5/2013 | Abiola | G06Q 40/025 |
| | | | 705/38 |
| 2014/0244524 A1* | 8/2014 | Brestoff | G06F 40/211 |
| | | | 705/311 |
| 2015/0356477 A1* | 12/2015 | Milkman | G06Q 10/0633 |
| | | | 705/7.27 |
| 2018/0025428 A1* | 1/2018 | Jain | G06Q 40/06 |
| | | | 705/36 R |
| 2018/0336507 A1* | 11/2018 | Torrado | G06N 20/00 |
| 2019/0114711 A1 | 4/2019 | Yu et al. | |
| 2019/0188616 A1* | 6/2019 | Urban | G06Q 10/0875 |
| 2020/0012978 A1* | 1/2020 | Brannon | G06Q 10/067 |
| 2020/0081990 A1* | 3/2020 | Caputo | G06F 16/2358 |
| 2020/0092319 A1* | 3/2020 | Spisak | G06N 7/01 |
| 2021/0042767 A1* | 2/2021 | Guan | G06Q 30/0255 |
| 2021/0342554 A1* | 11/2021 | Martin | G06Q 10/0639 |
| 2021/0349994 A1* | 11/2021 | Ravindra | G06F 21/577 |
| 2022/0270008 A1* | 8/2022 | Milden | G06Q 10/0635 |

* cited by examiner

SYSTEM AND METHOD TO MONITOR RELEVANCE OF CUSTOMER'S BUSINESS RISK DUE TO MARKET CHANGES

FIELD

The present application relates generally to information handling and/or data processing and analytics, and more particularly to methods, computer systems, and computer program products for monitoring and detecting changes in the market that effect business and credit risk.

BACKGROUND

Financial institutions, such as for example, banks during initial customer intake perform an initial analysis and credit check of a potential new customer where they look at structured data and unstructured data to ascertain information pertinent for doing financial business with the customer, especially in the case of high net loans. In cases where the financial institution provides a line of credit, or refinancing, it is important for the financial institution to understand the business health of the customer in order to continue their business relationship. Financial institutions typically do an initial entity analysis while on-boarding a new customer and/or at periodic intervals, for example every six months.

SUMMARY

The summary of the disclosure is given to aid understanding of, and not with an intent to limit, the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, the architectural structure, and their method of operation to achieve different effects. In this regard it will be appreciated that the disclosure presents and describes one or more inventions, and in aspects includes numerous inventions as defined by the claims.

A system, method, and/or computer program product is disclosed for monitoring and providing alert reports to changes in business risk of a targeted entity. The system, method and/or computer program product in one or more embodiments includes: retrieving one or more industry classifications for one or more core businesses in which the targeted entity competes; receiving news feeds related to the one or more industry classifications; detecting and extracting negative news from the news feeds related to the one or more industry classifications, wherein the negative news relates to the one or more core businesses in which the targeted entity competes; calculating an industry confidence score based upon on negative news extracted from the news feeds related to the one or more industry classifications; determining if the industry confidence score is greater than an industry confidence threshold; calculating, in response to the industry confidence score being larger than the industry confidence threshold, an entity confidence score for the targeted entity based upon negative news extracted from the news feeds related to the targeted entity; determining if the entity confidence score is larger than an entity confidence threshold; and generating, in response to the entity confidence score being larger than the entity confidence threshold, one or more new alert reports for the targeted entity. In one or more aspects, the system, method, and/or computer program product further includes: onboarding the targeted entity; extracting, in response to onboarding the targeted entity, the one or more industry classifications for the targeted entity; and calculating an initial targeted entity analysis.

The system, method, and/or computer program product in an embodiment further includes performing string searches in the news feeds, wherein the string searches include at least one of the group consisting of: one or more industry names of the one or more industry classifications, lexicons related to negative news for the one or more industry classifications, and combinations thereof. The system, method, and/or computer program product further includes in an aspect searching structured data for financial and market data related to the one or more industry classifications. Extracting negative news from the news feeds related to the one or more industry classifications includes in an embodiment searching unstructured and structured data related to the one or more industry classifications. Calculating an industry confidence score based upon on negative news extracted from the news feeds related to the one or more industry classifications and determining if the industry confidence score is greater than an industry confidence threshold, includes in an embodiment identifying industries impacted by the negative news related to the one or more industry classifications.

Calculating an entity confidence score for the targeted entity in an aspect includes extracting negative news from the news feeds related to the targeted entity. Extracting negative news from the news feeds related to the targeted entity includes in an aspect searching unstructured and structured data related to the targeted entity. The system, method, and/or computer program product further includes in an embodiment performing string searches in the news feeds, wherein the string searches include at least one of the group consisting of: the name of the targeted entity, lexicons related to negative news for the targeted entity, and combinations thereof. The system, method, and/or computer program product further includes in an embodiment searching structured data for financial and market data related to the targeted entity. In one or more embodiments, monitoring the change in industry confidence score and entity confidence score on a periodic basis and generating the alert report, wherein the alert report flags the one or more news articles that triggered the alert report is a further aspect of the system, method, and/or computer program product.

The system in one or more embodiments includes a memory storage device storing program instructions; and a hardware processor having circuitry and logic to execute said program instructions to generate the alert reports, the hardware processor coupled to said memory storage device and in response to executing said program instructions, is configured to perform one or more operations as specified above. In an aspect, a non-transitory computer readable medium comprising instructions that, when executed by at least one hardware processor, configure the at least one hardware processor to perform the operations as specified above and/or in additional operations.

The foregoing and other objects, features, and/or advantages of the invention will be apparent from the following more particular descriptions and exemplary embodiments of the invention as illustrated in the accompanying drawings wherein like reference numbers generally represent like parts of the illustrative embodiments of the invention.

BRIEF DESCRIPTION OF THE DRAWINGS

The various aspects, features, and embodiments of a system and/or method to monitor and update an entity's financial risk based upon market changes will be better understood when read in conjunction with the figures provided. Embodiments are provided in the figures for the purpose of illustrating aspects, features, and/or various embodiments of the systems and methods, but the claims should not be limited to the precise arrangement, structures, features, aspects, systems, platforms, modules, functional units, assemblies, subassemblies, systems, circuitry, embodiments, methods, processes, techniques, and/or devices shown, and the arrangements, structures, systems, platforms, modules, functional units, assemblies, subassemblies, features, aspects, methods, processes, techniques, circuitry, embodiments, and devices shown may be used singularly or in combination with other arrangements, structures, assemblies, subassemblies, systems, platforms, modules, functional units, features, aspects, circuitry, embodiments, methods, techniques, processes, and/or devices.

DETAILED DESCRIPTION

The following description is made for illustrating the general principles of the invention and is not meant to limit the inventive concepts claimed herein. In the following detailed description, numerous details are set forth in order to provide an understanding of the system, method, and/or techniques for monitoring and recalculating the business risk of an entity due to market changes, however, it will be understood by those skilled in the art that different and numerous embodiments of the system and its method of operation may be practiced without those specific details, and the claims and disclosure should not be limited to the arrangements, structures, systems, assemblies, subassemblies, platforms, modules, functional units, circuitry, embodiments, features, aspects, processes, methods, techniques, and/or details specifically described and shown herein. Further, particular features, aspects, arrangements, structures, systems, assemblies, subassemblies, platforms, modules, functional units, circuitry, embodiments, methods, processes, techniques, details, etc. described herein can be used in combination with other described features, aspects, arrangements, structures, systems, assemblies, subassemblies, platforms, modules, functional units, circuitry, embodiments, techniques, methods, processes, details, etc. in each of the various possible combinations and permutations.

The following discussion omits or only briefly describes conventional features of information processing systems and data networks, including electronic data analytics programs or electronic risk assessment tools configured and adapted to monitor and recalculate an entity's business risk due to market changes, which should be apparent to those skilled in the art. It is assumed that those skilled in the art are familiar with data processing and data analytics including large scale data processing/analytics (also referred to as information/data processing systems) and their operation, and the application of data analytics, including data analytics systems and processes to monitor and calculate an entity's business risk. It may be noted that a numbered element is numbered according to the figure in which the element is introduced, and is typically referred to by that number throughout succeeding figures.

Figure 1:
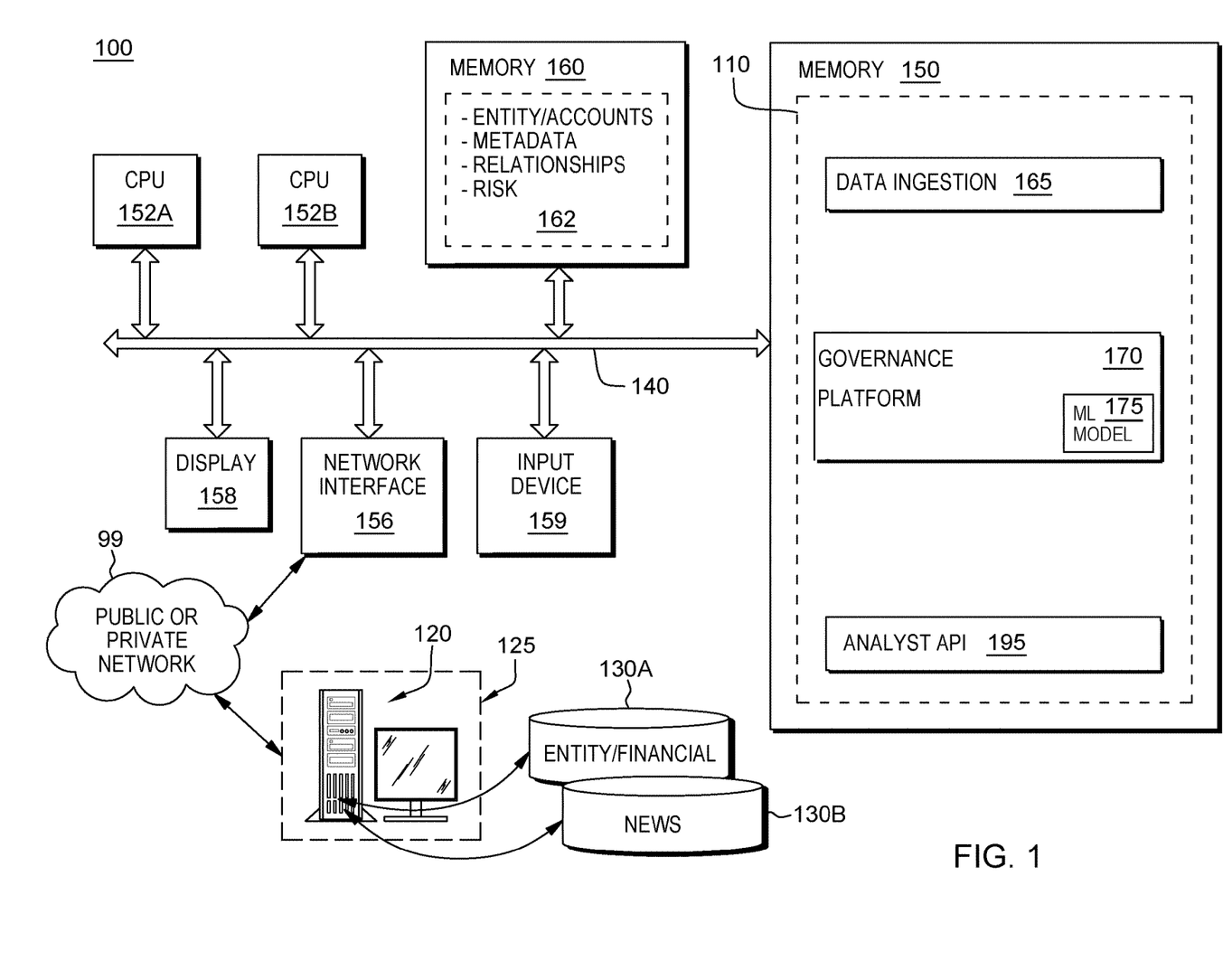
FIG. 1 schematically shows an exemplary computer system/computing device which is applicable to implement one or more embodiments of monitoring and reevaluating a customer's business risk due to market changes according to the present disclosure.

FIG. 1 illustrates an embodiment computer system functioning as an electronic risk monitoring and assessment tool 100 implementing methods to monitor and recalculate business financial risk due to market changes. In embodiments, such a system tool 100 may be employed by or for a financial institution, for example, a bank, or any other entity that has a need to consider the credit worthiness or business risk of an entity or customer.

In the context of monitoring and calculating the credit worthiness or financial risk of a customer or entity, according to one embodiment, risk assessment tool 100 is a computer system, a computing device, a mobile device, or a server configured to run risk assessment software applications and models. In some aspects, computing device 100 may include, for example, personal computers, laptops, tablets, smart devices, smart phones, or any other similar computing device, an embodiment of which is described in more detail in FIG. 7.

Computing system 100 includes one or more hardware processors 152A, 152B (also referred to as central processing units (CPUs), a memory 150, e.g., for storing an operating system, application program interfaces (APIs) and program instructions, a network interface 156, a display device 158, an input device 159, and any other features common to a computing device. In some aspects, computing system 100 may, for example, be any computing device that is configured to communicate with one or more web-sites 125 including a web-based or cloud-based server 120 over a public or private communications network 99. For instance, a web-site may include a financial institution that records/stores information, e.g., multiple financial transactions occurring between numerous parties (entities) and electronic transactions. Such electronic transactions may be stored in a database 130A with associated financial and entity information. News and related stories can be stored in database 130B. Further, as shown as part of system 100, there can be a local memory and/or an attached memory storage device 160, or a remote memory storage device, e.g., a database, accessible via a remote network connection for input to the system 100.

In the embodiment depicted in FIG. 1, processors 152A, 152B may include, for example, a microcontroller, Field Programmable Gate Array (FPGA), or any other processor that is configured to perform various operations. Communication channels 140, e.g., wired connections such as data bus lines, address bus lines, Input/Output (I/O) data lines, video bus, expansion busses, etc., are shown for routing signals between the various components of system 100. Processors 152A, 152B are configured to execute instructions as described below. These instructions may be stored, for example, as programmed modules in an associated memory storage device 150.

Memory 150 may include, for example, non-transitory computer readable media in the form of volatile memory, such as random access memory (RAM) and/or cache memory or others. Memory 150 may include, for example, other removable/non-removable, volatile/non-volatile storage media. By way of non-limiting examples only, memory 150 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a web-site server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with the computing device 100.

With respect to configuring the computer system as a risk assessment and monitoring tool 100 for monitoring and recalculating business risk based upon market changes, the local or remote memory 160 may be configured for storing information and associated meta-data. Such captured and stored data can include but is not limited to: parties, accounts, transactions, relationships, financial data, news articles, and associated metadata obtained from transactions and data stored in the electronic databases 130A, 130B. Alternately or in addition, the entity data, entity relationships, transactional data and meta-data 162 can be stored in a separate local memory storage device attached to the computer system 100.

Memory 150 of computer system 100 in one or more embodiments stores processing modules that include programmed instructions adapted to perform business risk assessment as well as to retrieve and parse through news articles and the like for information on market changes as discussed below.

In an embodiment, one of the programmed processing modules stored at the associated memory 150 include a data ingestion module 165 that provides instructions and logic for operating circuitry to access/read large amounts of data (e.g., parties, accounts, transactions data) for use by other modules that process and analyze the data to calculate risk and/or confidence scores. In one or more embodiments, the input data for data ingestion module 165 comprises parties, accounts, transactions, financial information, credit ratings, news stories, etc.

In an embodiment, memory 150 includes a Analytics and Governance Platform 170 that provides instructions and logic for operating circuitry to process and analyze data, typically large amounts of data, to form and output confidence scores. Analytics and Governance Platform 170 (also referred to as Governance Platform 170, Platform 170, or module 170) can contain and call up one or more models to process and analyze the data and provide associated calculations and scores for review by an analyst. Governance Platform/Module 170 can further include and invoke supervised (or unsupervised) machine learning (ML) techniques through, for example, ML Model 175, for assessing credit worthiness, calculating confidence scores, and/or accessing business risk, as known in the art. Based on features and metadata relating to a party, transactions, financial data, environmental data, industry data, location data, other data, and changes to the data that are captured, techniques are employed to compute credit worthiness, business risk, and/or confidence scores.

Memory 150 optionally includes a supervisory program having instructions for configuring the computing system 100 to call one or more, and in an embodiment all, of the program modules and invoke the risk assessment and monitoring operations of the risk assessment tool 100. In an embodiment, the supervisory program calls methods and provides application program interfaces (APIs) for running Governance Platform 170 for generating confidence scores, business risk assessment and/or other programs using the data, including for example news information, ingested by the data ingestion module 165.

At least one application program interface (API) 195 is invoked in an embodiment to receive input data from an "analyst", e.g., a domain expert trained in finance/financial matters particularly in the context of accessing business risk, credit worthiness, and confidence scores. Via API 195, the analyst receives reports, and/or confidence scores. The analyst reviews the reports and/or scores and in an embodiment can provide feedback information on the risk.

Figure 2:
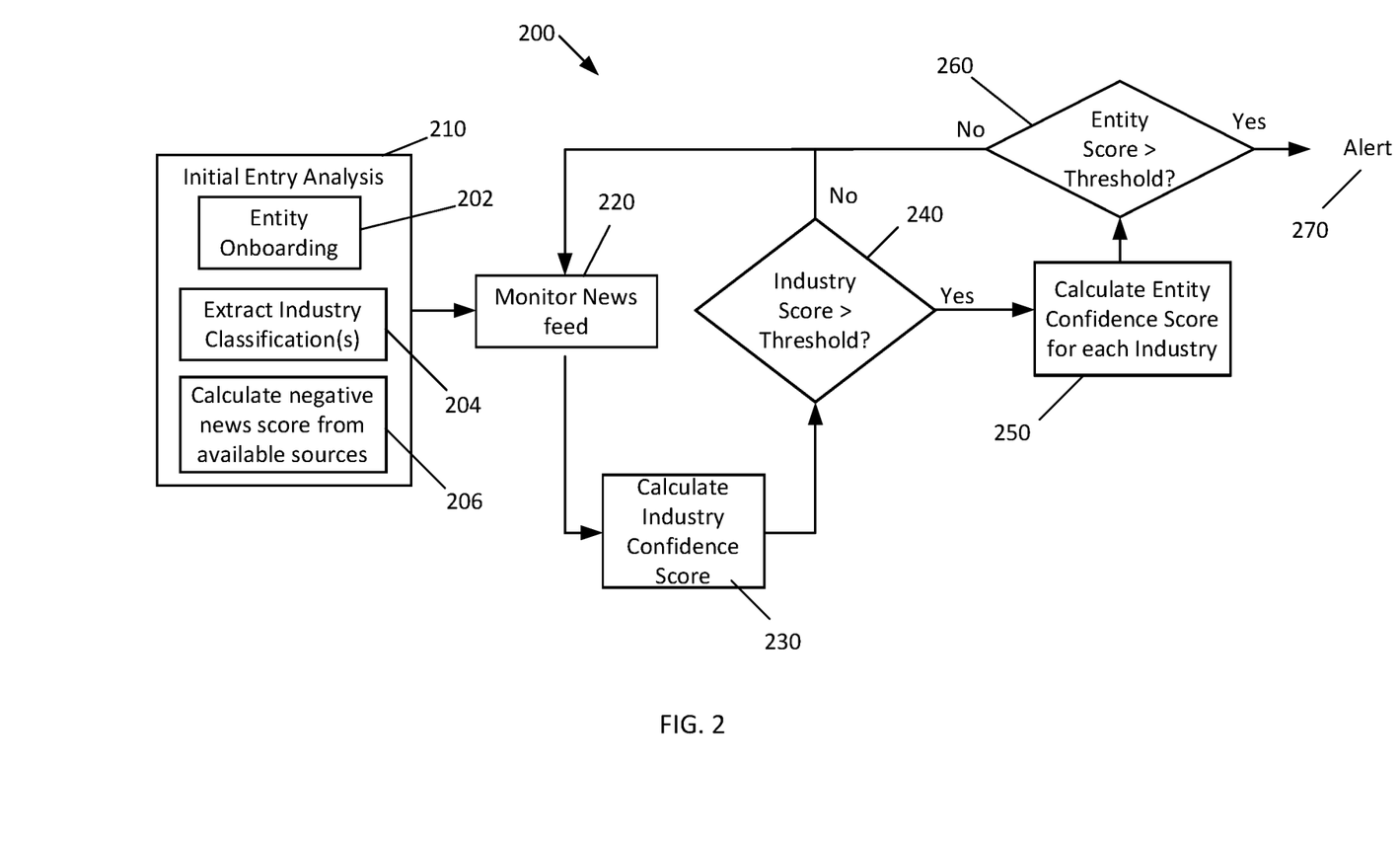
FIG. 2 schematically illustrates an overview flow chart of a method to calculate, monitor, and recalculate a customer's business risk in accordance with an embodiment of the present disclosure.

FIG. 2 is an exemplary flowchart in accordance with an embodiment illustrating and describing a method 200 of assessing and reassessing business risk due to market changes. While the method 200 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 2, but the process may be integrated and/or one or more steps may be performed together, simultaneously, or the steps may be performed in the order disclosed or in an alternate order.

Figure 3:
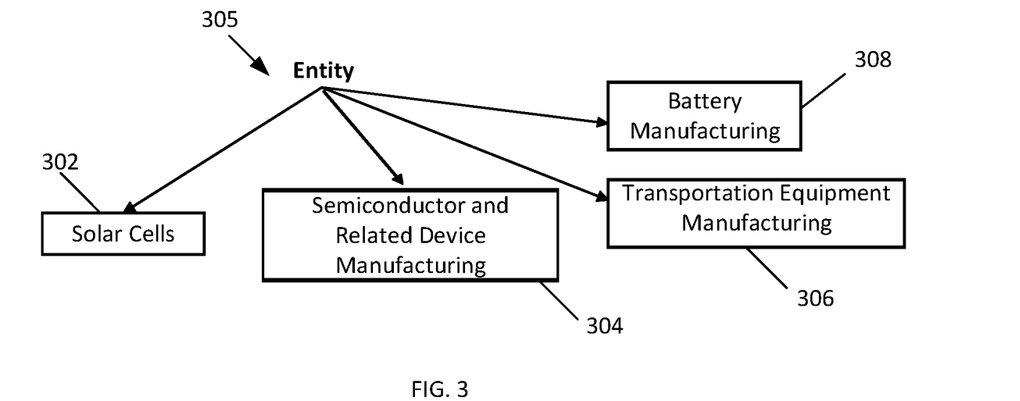
FIG. 3 is a diagram of an entity and the industries or businesses in which the targeted entity competes.

At 210, in one or more embodiments, an initial entity analysis is performed at onboarding a new client that includes assessing the credit worthiness and/or business risk of an entity. Generally at onboarding a new customer, a bank or financial institution will perform an initial due diligence where the bank will calculate a risk score and/or a negative news score from news on that company from the internet. The Initial Entity Analysis 210 can include one or more steps including at 202 performing an entity onboarding where financial and credit risk information is collected and entered, such as, for example, revenues, profits, size of company, tangible assets (real estate holdings, etc.) balance statements, credit scores, etc., into the system 100. The Initial Entity Analysis 210 can also include at 204 retrieving the industry classification for the primary entity and their core businesses. Data sources to investigate and extract the industry classification include Dow Jones Company search API, Dun & Bradstreet. In an aspect all the industry classification data is extracted the primary entity at 204. An example of extracting the industry classification data is illustrated in FIG. 3. FIG. 3 illustrates how an entity 305 can be involved in multiple industries, for example, solar cells 302, Semiconductor and related device manufacturing 304, transportation equipment manufacturing 306, and battery manufacturing 308. The Initial Entity Analysis 210 can also include at 206 calculating negative news score from available news. More, less, and/or different steps can be included in the Initial Entity Analysis 210, and the method 200 is not limited to steps 202, 204, and/or 206.

There are a lot of market changes that impact the risk and credit worthiness of a particular business. For example, regulatory or policy changes can impact a business as well as major events such as oil embargos, civil war, oil market crashes, pandemics such as for example, COVID-19, cryptocurrency crashes, housing market crash, economic recession, etc. To broaden risk assessment of a given entity, in one or more embodiments, specific news or events that are likely to change the risk or business health of a particular or given entity are watched, reviewed, and/or extracted. For example, in the case of oil market crash or energy policy changes, entities that are involved or rely on the oil market will be affected. The proposed system and method detects regulatory, policy, and market changes and dynamically assesses the effect on the credit worthiness, business risk score, and/or confidence score of the business entity. There are standards, for example NAICS, UK SIC 2003, D&B standard Industry Code, etc., to classify an entity's businesses into categories, such as for example as shown in FIG. 3. The current system and method leverages and uses such available structured data to gain information on the operations, industries, and geographic locations of the entity and assess the credit worthiness or risk to doing business or continuing to do business with an entity by doing unstructured news analysis to provide financial institutions a way to monitor a customer's business health by periodically evaluating their core business risk with respect to the industry performance and generate alerts when a deviation is detected.

The method 200 at 220 includes monitoring news feeds and at 230 calculating an industry confidence score. At 240 it is determined if the industry confidence score is above a certain threshold. If at 240, the industry negative news score is below a threshold (240: No), then the process reverts back to 220 where news feeds are monitored. If at 240, the industry negative news is above a threshold (240: Yes), then the process 200 continues to 250 where the Entity Confidence Score for each industry is calculated. The threshold at 240 can be predetermined, adjustable, programmable, or manually set (and reset) by a user. At 260 it is determined if the Entity Confidence Score is above a certain threshold. If at 260, the entity negative news score is below a threshold (260: No), then the process reverts back to 220 where news fees are monitored and the process continues to 230. If at 260, the industry negative news is above a threshold (260: Yes), then the process continues to 270 where an alert is raised. The threshold at 260 can be predetermined, adjustable, programmable, or manually set (and reset) by a user.

Figure 4:
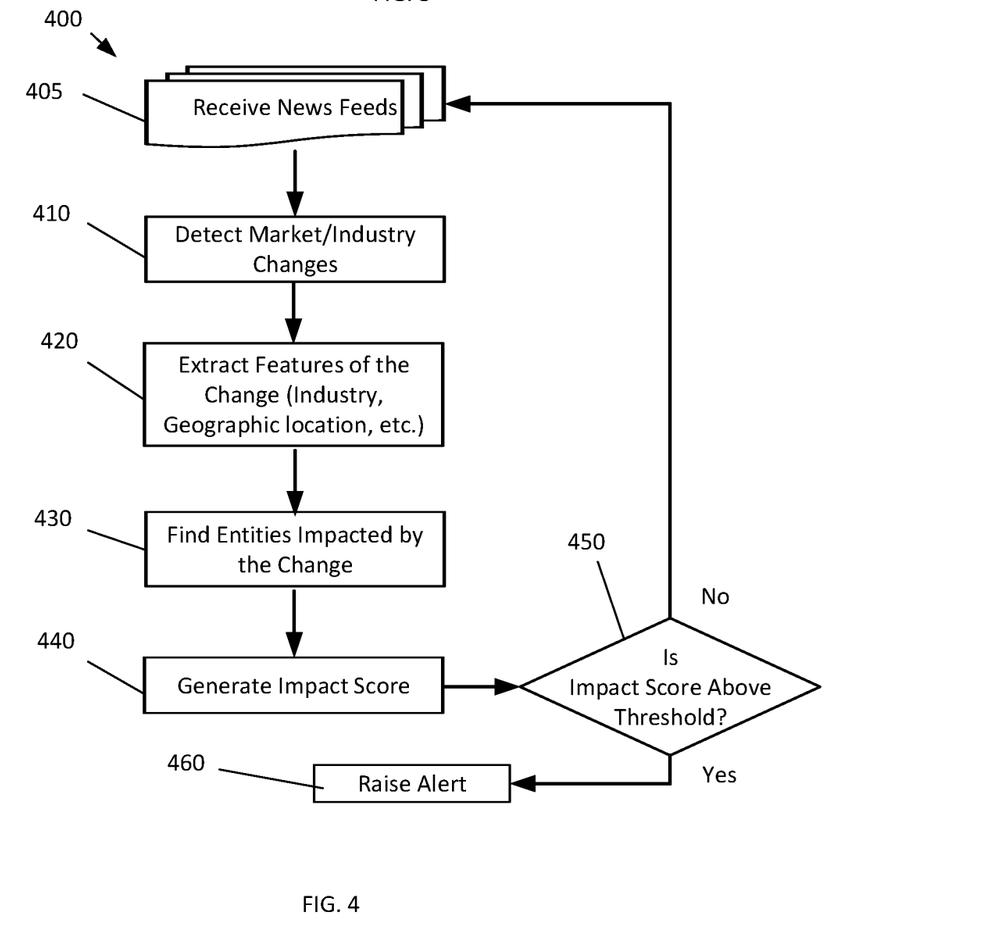
FIG. 4 illustrates an overview flow chart of a method to monitor and recalculate a customer's business risk due to market changes according to an embodiment of the present disclosure.

FIG. 4 shows an overview block diagram of an embodiment of a method 400 to monitor and calculate a risk score for an entity based upon negative market news. At 405 news feeds are received by the system. At 410 detect market and/or industry changes and at 420 extract features of the change, for example in the industry, by geographic location, etc. At 430 the process 400 includes finding the entities, e.g., customers, impacted by the change and at 440 calculating or generating the impact on the confidence score as a result of the change. At 450 it is determined whether the impact score, e.g., the confidence score or negative news score, is above a threshold. If at 450, the negative news for the entity has impacted the score above a threshold (450: Yes), then at 460 an alert is given or raised. If at 450, the negative news for the entity is below a threshold (450: No), then the process 400 continues back to 405 where news feeds are received. The threshold at 450 can be preselected, predetermined, programmed and/or manually set and reset as desired.

Figure 5:
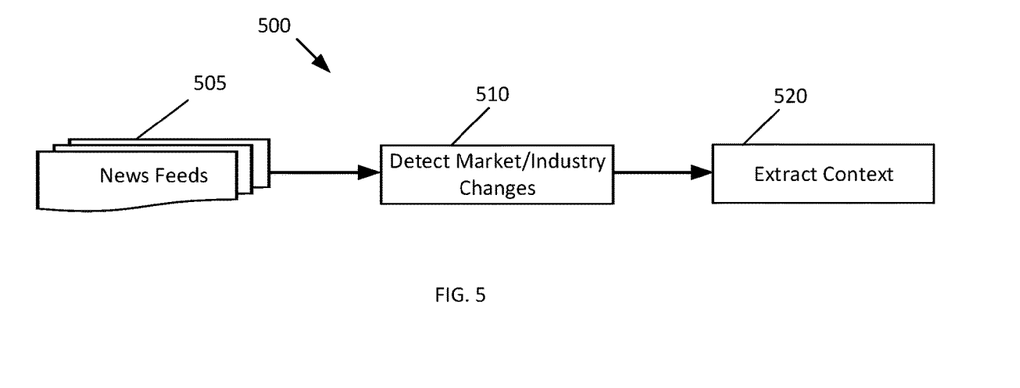
FIG. 5 illustrates a flow chart of extracting data from news feeds according to an aspect of the present disclosure.

The process of monitoring the recalculating a confidence score for an entity described in FIGS. 2 & 4 will be explained in greater detail. During the Initial Entity Analysis 205 the industry classifications for the primary entity were collected. As part of the process of monitoring and recalculating a confidence score, e.g., a score indicative of the business risk or credit worthiness of an entity, the industry classifications of the core businesses of the entity are retrieved or collected. For example, for the entity of FIG. 3, the industry classification data would be collected for each of the industries 302, 304, 306, and 308. In addition, as indicated at 220 in FIGS. 2 and 405 in FIG. 4, news feeds are received and reviewed and/or analyzed. From the news feeds, at 410 detect market and industry changes and at 420 extract the negatively impacted industry and geographic location news. FIG. 5 illustrates a high level overview block diagram of analyzing, detecting, and/or extracting negative features from news feeds. News feeds 505 are received and are filtered at 510 to obtain and/or detect market changes, including policy and/or regulatory changes. At 515, semantics are applied to extract the context, for example industry, geographic and timeline data as well as negative, neutral, and positive news, and in an embodiment with particular focus on extracting negative news that might detrimentally effect an industry or entity business outlook and credit risk.

The system and/or method in one or more embodiments can detect market, regulatory, and/or policy changes from news fees and extract the negatively impacted industry, geographic, and timeline data. In one or more embodiments, the system and/or method can use unstructured data by retrieving news articles from data sources using search strings containing industry names and lexicons related to negative news, policy changes, regulatory changes, market changes, geopolitical changes for or by industry and geographic region. The data located and extracted suing the search strings and lexicons can be filtered from time periods. The system and/or method in one or more embodiments can also use structured data, for example, where the input data fields are percentage change in year-over-year (YOY) revenue, expected growth, and/or market trends to name a few. A confidence value can be a target variable for the regression model of the structured data.

Figure 6:
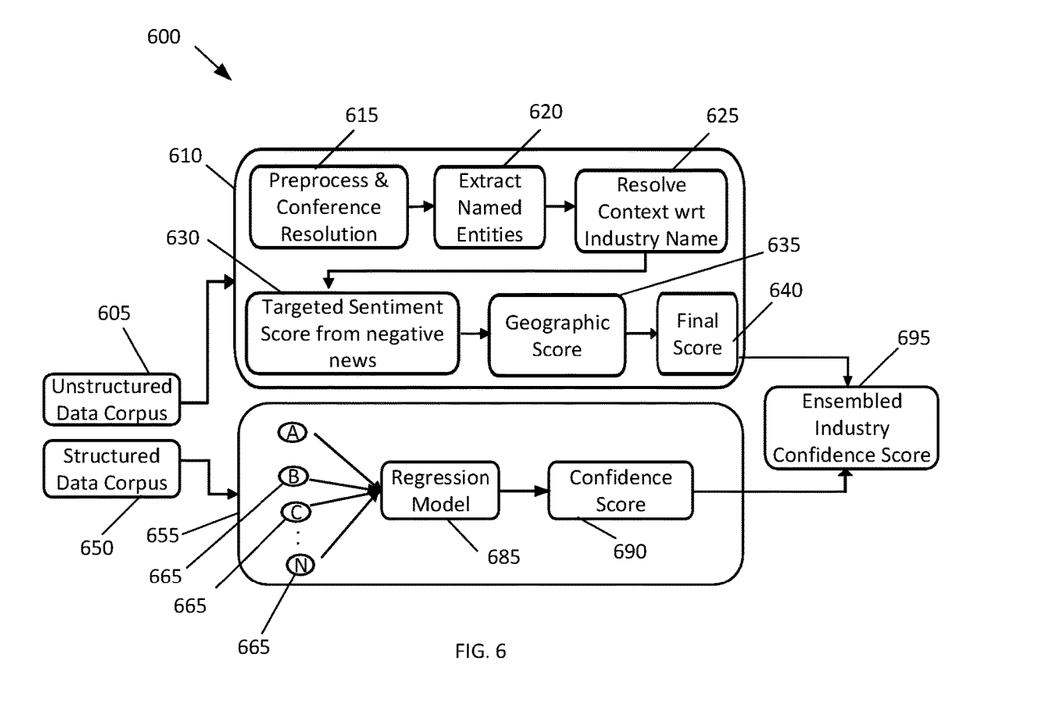
FIG. 6 illustrates a schematic block diagram of a portion of the method of FIGS. 2 & 4 to monitor and recalculate a customer's business risk due to market changes.

FIG. 6 illustrates an embodiment of calculating an industry confidence score in FIG. 2 (e.g., step 230), which in an aspect includes detecting regulatory, policy, market, and geopolitical changes, and extracting the negatively impacted industry and geographical locations. The method 600 of FIG. 6 includes feeding the unstructured data corpus 605 into a machine learning (ML) industry news module 610. The data corpus 605 includes articles from the internet that can be retrieved using search strings containing the industry name and Lexicons related to negative news for the industry and geographic regions pertinent to the industry.

At 615 the unstructured news data is processed. In an embodiment, at 615 Preprocess & Conference Resolution is performed which in an aspect includes removing unnecessary and/or junk characters in the article after it is downloaded. In an aspect, Preprocess & Conference Resolution at 615 can also include replacing pronouns in the article with the indicated proper nouns. The processed news feeds are passed to 620 where the names of entities are extracted, e.g., proper nouns are extracted from the processed unstructured news feeds, e.g., from the news article. At 620 all entity names are extracted and not just the name of the entity at issue is extracted. At 625 the unstructured news feeds are filtered to the specific targeted industry at issue. That is, at 625, the sentences in the article that are relevant to the required/relevant proper nouns are identified. In case of industry workflow, all sentences regarding the industry at issue are extracted.

At 630 the news feeds are further filtered to extract negative news for the targeted industry at issue, e.g., the industry of the targeted entity. In one or more embodiments, the news feeds are filtered to extract negative news for all industries, and then further filtered for negative news by industry. In an aspect, it is determined if the negative news for an industry is above a certain threshold. In one or more embodiments, at 630 a score is calculated for the negativity of the article for the industry. At 635 the news feeds, e.g., the negative news feeds in the targeted industry, optionally are filtered to a geographic location or region. In one or more embodiments, at 635 a score is calculated for the negativity of the article for the geographic region. The output is fed into an algorithm in final score module 640 to produce a score for the industry. The algorithm in final score module 640 can take many different forms, but preferably it provides a score indicative of the health of the industry or industries in which the targeted entity participates.

The structured data corpus 650 is fed into industry financial/market module 655 simultaneously with or sequentially after the unstructured data corpus 605 is fed into industry news ML module 610. The structured data corpus 650 fed into industry financial/market module 655 includes financial and market data 665, such as for example, fortune ranking of the industry, revenue for the industry, profits for the industry, year-over-year (YOY) revenue percentage change for the industry, estimated growth rate for the industry, deviation from estimated growth rate for the industry, market size growth for the industry, expected market trends for the industry, investments made by the industry, and other financial data on an industry level basis. The financial data 665, shown in FIG. 6 as A, B, C ... N, is fed into a regression model 685 and outputs a confidence score 690 for the industry based upon the data 650 fed into financial, market module 655. The final score 640 from industry news module 610 and the confidence score 690 from industry financial/market module 655 are fed into module 695 where an ensembled or collective industry confidence score is derived or calculated.

In one or more embodiments, if the industry confidence score is above a threshold, the process 200 at step 250 calculates the confidence score for the targeted entity in each of the industries that the targeted entity participates. The system and/or method, in one or more embodiments, identifies the impacted business or industry for the targeted entity and calculates the confidence score for the entity.

Figure 7:
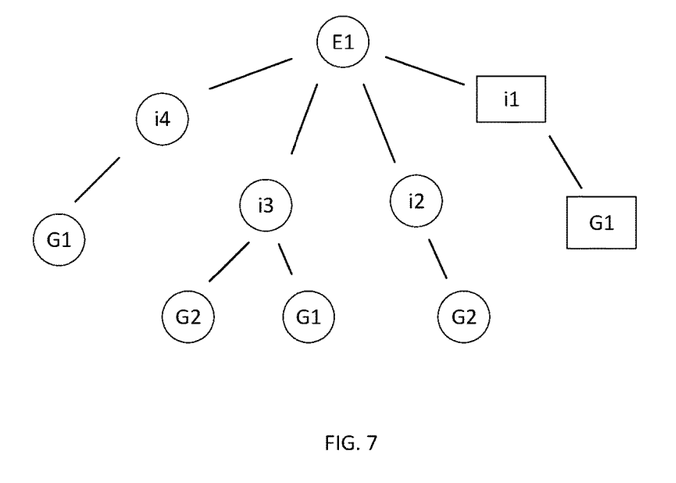
FIG. 7 illustrates a diagrammatic illustration of an entity being affected by changes in industry i1 in geographic location G1.

FIG. 7 illustrates a diagrammatic illustration of identifying all the entities impacted by negative news according to an embodiment of the disclosure. FIG. 7 shows an entity E1 that participates in industries i1, i2, i3 and i4, where industry i1 has a location in geographic region G1, where industry i2 has a location in geographic region G2, where industry i3 has locations in geographic regions G1 and G2, and industry i4 has a location in geographic region G1. FIG. 7 has a mapping for one entity E1, but that mapping is applied to numerous entities. In the example of FIG. 7 industry i1 in geographic location G1 has negative news. The negative news in industry i1 in geographic location G1 affects entity E1 as shown in FIG. 7 by squares i1 and G1 but not the other industries in which entity E1 participates. In the example of FIG. 7 although entity E1 is effected by the negative news in industry i1 in geographic region G1 the impact score is 0.5 which is not above the threshold, so no alert is given for entity E1. The negative news in industry i1 in geographic region G1 also affects numerous other entities. The impact score is calculated for all the entities that participate in the industry that was impacted by the negative news. The impact score for entity E2 (not shown), for example is calculated and is 0.9, which is above the threshold and the system outputs an alert for entity E2. The impact score for entity E3 is calculated and is 0.4, which is below the entity confidence score threshold and no alert is provided.

In one or more embodiments, the system and/or method will identify the impacted businesses or industry for all the impacted entities and calculate the confidence score for the targeted entity that participates in the impacted industry and geographic locations. To perform the functions of identifying the impacted industry and calculating the confidence score for the targeted entity, the system and/or method can use unstructured data by retrieving news articles from data sources using search strings containing the name of the targeted entity and lexicons related to negative news and geographic locations of the targeted entity. The data located and extracted using the search strings and lexicons can be further filtered using time periods. The system and/or method in one or more embodiments can also use structured data about the targeted entity, for example, where the input data fields are size and age of the company, financial statements, fortune ranking, percentage change in year-over-year (YOY) revenue, expected growth, etc. to name a few. A confidence value can be a target variable for the regression model of the structured data.

Figure 8:
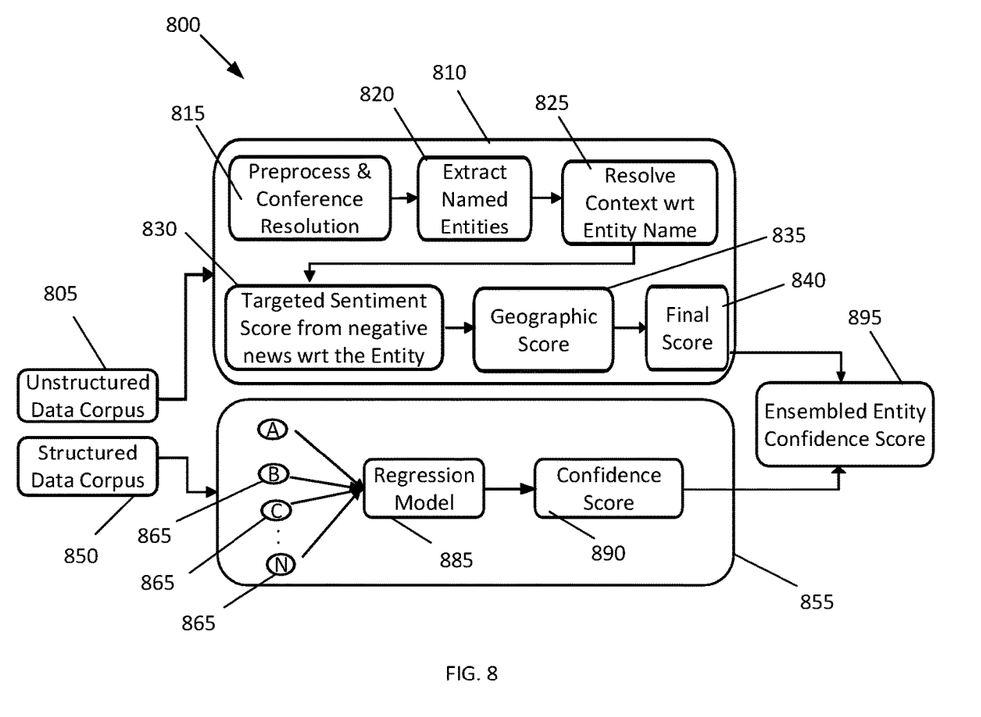
FIG. 8 illustrates a schematic block diagram of a portion of the method of FIGS. 2 & 4 to monitor and recalculate a customer's business risk due to market changes.

FIG. 8 discloses an embodiment of calculating an entity confidence score in FIG. 2 (e.g., step 250), which in an aspect includes detecting regulatory, policy, market, and geopolitical changes for the impacted industries of the targeted entity, and extracting the negatively impacted industry and geographical locations for the targeted entity. The method 800 of FIG. 8 includes feeding the unstructured data corpus 805 into a machine learning (ML) entity news module 810. The data corpus 805 includes articles from the internet that can be retrieved using search strings containing the entity name and Lexicons related to negative news related to the targeted entity and geographic locations of the targeted entity.

At 815 the unstructured news data is processed. In an embodiment, at 815 Preprocess & Conference Resolution refers to removing unnecessary and/or junk characters in the article after it is downloaded. In an aspect, Preprocess & Conference Resolution at 815 can also include replacing pronouns in the article with the indicated proper nouns. The processed news feeds are passed to 820 where the name of all entities in the impacted industry are extracted, e.g., proper nouns are extracted from the processed unstructured news feeds (e.g., from the news articles). At 820 all entity names in the impacted industry are extracted and not just the name of the entity at issue is extracted. At 825 the unstructured news feeds are filtered to the specific targeted entity at issue. That is, at 825 the context of the negative news is resolved for the targeted entity. In an aspect, the sentences in the article(s) that are relevant to the targeted entity are identified.

At 830 the news feeds are further filtered to extract negative news for the targeted entity at issue. In one or more embodiments, at 830 a score is calculated for the negativity the article(s) for the entity. At 835 the news feeds, e.g., the negative news feeds for the targeted entity are filtered to a geographic location or region. In one or more embodiments, a score is calculated for the negativity of the article(s) for the geographic region. The output of 835 is fed into an algorithm in final score module 840 to produce a score for the targeted entity. The algorithm in final score module 840 can take many different forms, but preferably it provides a score indicative of the health of the targeted entity based upon negative news articles and the like from unstructured data, such as for example, articles from the internet.

The structured data corpus 850 is fed into entity financial/market module 855 simultaneously with or sequentially after the unstructured data corpus 805 is fed into entity news ML module 810. The structured data corpus 850 fed into entity financial/market module 855 includes financial and market data 865, such as for example, fortune ranking for the entity, revenue for the entity, profits for the entity, year-over-year (YOY) revenue percentage change for the entity, estimated growth rate for the entity, market share growth for the entity, deviation from the entity's estimated growth rate, investments made by the entity, and other financial data on an entity basis. The financial data 865, shown in FIG. 8 as A, B, C . . . N, is fed into a regression model 885 and outputs a confidence score 890 for the entity based upon the data 850 fed into entity financial, market module 855. The final score 840 from entity news module 810 and the confidence score 890 from entity financial/market module 855 are fed into module 895 where an ensembled or collective entity confidence score is derived or calculated. If the entity confidence score calculated in module 895 is above a threshold, then an alert can be provided regarding the targeted entity. It should be recognized that the threshold can be predetermined, preselected, programmable, and/or changeable to met desired requirements.

The system and/or method can continuously monitor the change in industry confidence score and company confidence score and generate alerts for targeted entities. In one or more embodiments, periodic investigations on the primary or targeted entity and/or core business industries can be run to monitor the news and calculate a company's confidence score. If any deviation is detected in the company's industry or the company's performance (e.g., the company's confidence score), then the system can generate alerts in appropriate circumstances, and in an aspect can flag the articles which generated or resulted in the abrupt change in the industry confidence score or the targeted entity confidence score. The periodic investigations can be run on a set schedule, for example every quarter, or at any desired time including manually by a user.

Figure 9:
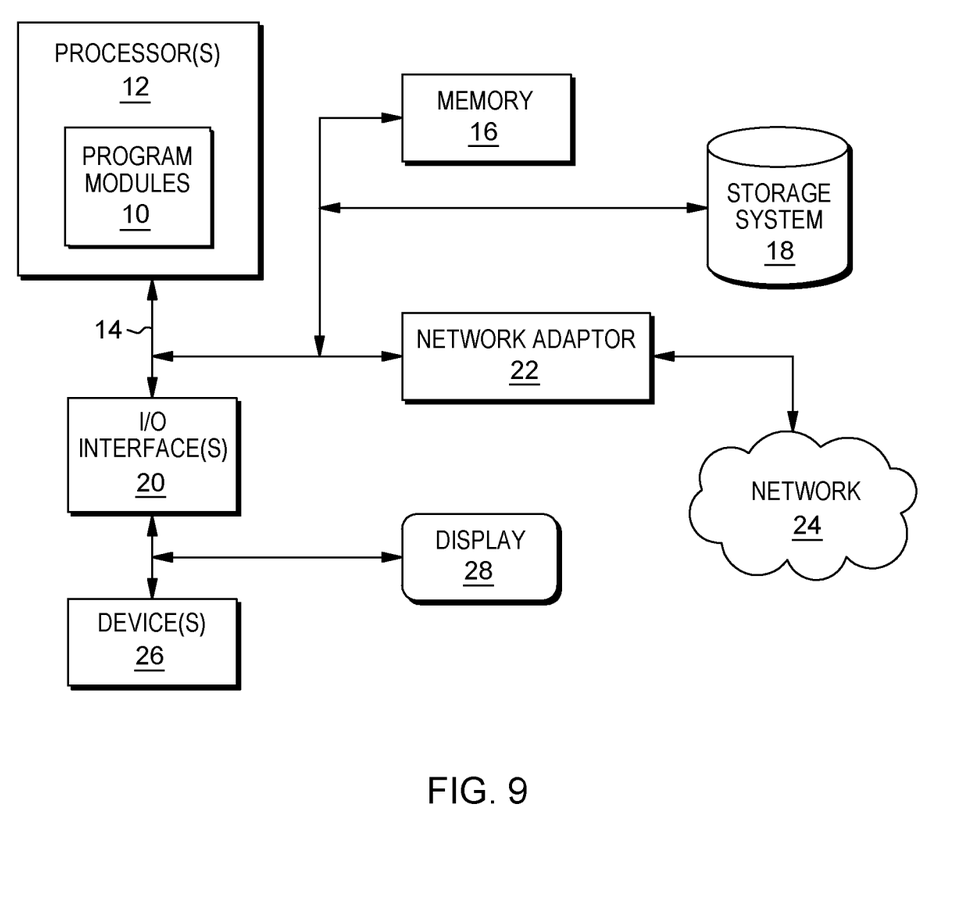
FIG. 9 illustrates yet another exemplary system in accordance with the present disclosure.

FIG. 9 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIG. 1).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by the computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment and terminology was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of monitoring and providing alert reports to changes in business risk of a targeted entity comprising:

identifying a target entity;

identifying for the target entity one or more target industries corresponding to one or more respective core businesses in which the target entity competes;

obtaining one or more industry classifications for the one or more target industries;

receiving, by the computing element, news feeds related to at least one of an industry group consisting of: the one or more retrieved industry classifications, the one or more target industries, and combinations thereof;

detecting and extracting, by the computing element, an unstructured data corpus from the news feeds by performing string searches in the news feeds, wherein the string searches include: one or more target industry names for the target industries, the one or more retrieved industry classifications, lexicons related to negative news for at least one of the industry group, lexicons related to market changes in at least one of the industry group, lexicons related to regulatory changes in at least one of the industry group, lexicons related to policy changes in at least one of the industry group, lexicons related to political changes in at least one of the industry group, lexicons related to climate changes in the at least one of the industry group, and lexicons related to geographical changes in at least one of the industry group;

feeding the unstructured data corpus into an industry news machine learning model that: (a) extracts the names of all entities identified in the unstructured data corpus, (b) filters the unstructured data corpus to one or more targeted industries using the extracted names of all the entities identified in the unstructured data corpus, (c) extracts negative news related to the one or more target industries, and (d) feeds the negative news related to the one or more target industries into an industry news machine learning algorithm to produce by the computing element an unstructured data corpus industry score;

feeding structured industry data corpus into a regression model to produce a structured data corpus industry score;

calculating, by the computing element, an industry confidence score based upon the unstructured data corpus industry score and the structured data corpus industry score;

determining, by the computing element, if the industry confidence score is greater than an industry confidence threshold;

feeding, in response to the industry confidence score being larger than the industry confidence threshold, the unstructured data corpus into an entity news machine learning model that: (a) extracts the name of the target entity in the unstructured data corpus, (b) filters the unstructured data corpus to the target entity, (c) extracts negative news related to the target entity, and (d) feeds the negative news related to the target entity into an entity news machine learning algorithm to produce by the computing element an unstructured data corpus entity score;

calculating, by the computing element, an entity confidence score for the targeted entity, by the computing element, based upon the unstructured data corpus entity score;

determining, by the computing element, if the entity confidence score is larger than an entity confidence threshold; and generating by the computing element, in response to the industry confidence score being larger than the industry confidence threshold and the entity confidence score being larger than the entity confidence threshold, one or more new alert reports for the targeted entity.

2. The computer-implemented method according to claim 1, wherein obtaining the one or more industry classifications includes obtaining the industry classification from at least one of the group consisting of Dow Jones company search API, Dun & Bradstreet, and combinations thereof.

3. The computer-implemented method of claim 1, further comprising:
onboarding the targeted entity;
extracting by the computing element, in response to onboarding the targeted entity, the one or more industry classifications for the targeted entity; and
calculating, by the computing element, an initial targeted entity analysis.

4. The computer-implemented method according to claim 1, further comprising feeding structured financial and market data corpus into a regression model to produce a structured data corpus entity score; and using the structured data corpus entity score and the unstructured data corpus entity score to calculate the entity confidence score for the targeted entity.

5. A computer-implemented method according to claim 1, wherein calculating an entity confidence score for the targeted entity comprises using the unstructured data corpus entity score and using structured data corpus related to the targeted entity.

6. The computer-implemented method according to claim 5, further comprises feeding structured financial and market data corpus into a regression model to produce a structured data corpus entity score and using the structured data corpus entity score to calculate the entity confidence score.

7. The computer-implemented method according to claim 5, further comprising searching, by the computing element, structured data for financial and market data related to the targeted entity to generate the structured data corpus related to the target entity.

8. The computer-implemented method according to claim 1, further comprising monitoring the change in industry confidence score and entity confidence score on a periodic basis and generating, by the computing element, the alert report, wherein the alert report flags the one or more news articles that triggered the alert report.

9. The computer-implemented method according to claim 1, further comprising searching, by the computing element, structured data for financial and market data related to at least one of the industry group to generate the structured industry data corpus.

10. The computer-implemented method according to claim 1, further comprising filtering by one or more time periods the unstructured data corpus detected and extracted from the news feeds.

11. The computer-implement method according to claim 1, further comprising: calculating an industry negativity score for each article extracted from the negative news relating to the one or more target industries; filtering the extracted negative news relating to the one or more target industries by at least one of a location group consisting of a geographic location, a geographic region, and combinations thereof to obtain extracted industry geographic negative news; feeding the industry negativity score and the extracted industry geographic negative news into the industry new machine learning algorithm to produce the unstructured data corpus industry score; calculating an entity negativity score for each article extracted from the negative news relating to the target entity; filtering the extracted negative news relating to the targeted entity by at least one of the location group to obtain extracted entity geographic negative news; and feeding the entity negativity score and the extracted entity geographic negative news into the industry new machine learning algorithm to produce the unstructured data corpus entity score.

12. A computer-implemented system to generate alert reports in response to changes in business risk comprising:
a memory storage device storing program instructions; and
a hardware processor having circuitry and logic to execute said program instructions to generate the alert reports, the hardware processor coupled to said memory storage device and in response to executing said program instructions, is configured to:
identify a target entity;
identify for the target entity one or more target industries corresponding to one or more respective core businesses in which the target entity competes;
obtain one or more industry classifications for one or more targeted industries;
receive news feeds related to at least one of an industry group consisting of: the one or more retrieved industry classifications, the one or more target industries, and combinations thereof;
detect and extract an unstructured industry data corpus from the news feeds by performing string searches in the news feeds wherein the string searches include: one or more target industry names for the target industries, the one or more retrieved industry classifications, lexicons related to negative news for at least one of the industry group, lexicons related to market changes for at least one of the industry group, lexicons related to regulatory changes in at least one of the industry group, lexicons related to policy changes in at least one of the industry group, lexicons related to political changes in at least one of the industry group, lexicons related to climate changes in at least one of the industry group, and lexicons related to geographical changes in at least one of the industry group;
feed the unstructured industry data corpus into an industry news machine learning model that: (a) extracts the names of all entities identified in the unstructured industry data corpus, (b) filters the unstructured industry data corpus to the one or more targeted industries using the extracted names of all the entities identified in the unstructured industry data corpus, (c) extracts negative news related to the one or more targeted industries, and (d) feeds the negative news related to the one or more target industries into an industry news machine learning algorithm to produce an unstructured data corpus industry score;

feed structured industry data corpus into a regression model to produce a structured data corpus industry score;

calculate an industry confidence score based upon the unstructured data corpus industry score and the structured data corpus industry score;

determine if the industry confidence score is greater than an industry confidence threshold;

feed, in response to the industry confidence score being larger than the industry confidence threshold, the unstructured industry data corpus into an entity news machine learning model that: (a) extracts the name of the target entity in the unstructured industry data corpus, (b) filters the unstructured industry data corpus to the target entity, (c) extracts negative news related to the target entity, and (d) feeds the negative news related to the target entity into an entity news machine learning algorithm to produce an unstructured data corpus entity score;

feed structured entity data corpus into a regression model to produce a structured data corpus entity score;

calculate, in response to the industry confidence score being larger than the industry confidence threshold, an entity confidence score for the targeted entity based upon the unstructured data corpus entity score and the structured data corpus entity score; and determine if the entity confidence score is larger than an entity confidence threshold; and generate, in response to the industry confidence score being larger than the industry confidence threshold and the entity confidence score being larger than the entity confidence threshold, one or more new alert reports for the targeted entity.

13. The computer-implemented method according to claim 12, wherein the hardware processor in response to executing said program instructions generates a new industry confidence score and a new entity confidence score on a periodic basis and monitors for a change in industry confidence score and entity confidence score on the periodic basis and in response to the new industry confidence score being larger than the industry confidence threshold and in response to the new entity confidence score being larger than the entity confidence score generates a new alert report, wherein the new alert report flags the one or more news articles that triggered the alert report.

14. The computer-implemented system according to claim 12, wherein the hardware processor, in response to executing said program instructions, is further configured to:
search structured data for financial and market data related to at least one of the industry group to generate the structured industry data corpus.

15. The computer-implemented system according to claim 12, further configured to search structured data for financial and market data related to the targeted entity to generate the structured industry data corpus.

16. The computer-implemented system according to claim 12, further configured to filter by one or more time periods the unstructured industry data corpus detected and extracted from the news feeds.

17. The computer-implement system according to claim 12, further configured to: calculate an industry negativity score for each article extracted from the negative news relating to the one or more target industries; filter the extracted negative news relating to the one or more target industries by at least one of a location group consisting of a geographic location, a geographic region, and combinations thereof to obtain extracted industry geographic negative news; feed the industry negativity score and the extracted industry geographic negative news into the industry new machine learning algorithm to produce the unstructured data corpus industry score; calculate an entity negativity score for each article extracted from the negative news relating to the target entity; filter the extracted negative news relating to the targeted entity by at least one of the location group to obtain extracted entity geographic negative news; and
feed the entity negativity score and the extracted entity geographic negative news into the industry new machine learning algorithm to produce the unstructured data corpus entity score.

18. A non-transitory computer readable medium comprising instructions that, when executed by at least one hardware processor, configure the at least one hardware processor to:
identify a target entity;
identify for the target entity one or more target industries corresponding to one or more respective businesses in which the target entity competes;
obtaining one or more industry classifications for the one or more target industries;
receive news feeds related to at least one of an industry group consisting of: the one or more retrieved industry classifications, the one or more target industries, and combinations thereof;
detect and extract an unstructured industry data corpus from the news by performing string searches in the news feeds wherein the string searches include: one or more target industry names for the target industries, the one or more retrieved industry classifications, lexicons related to negative news for the industry group, lexicons related to market changes in at least one of the industry group, lexicons related to regulatory changes in at least one of the industry group, lexicons related to policy changes in at least one of the industry group, lexicons related to political changes in at least one of the industry group, lexicons related to climate changes in at least one of the industry group, and lexicons related to geographical changes in at least one of the industry group;
feed the unstructured industry data corpus into an industry news machine learning model that: (a) extracts the names of all entities identified in the unstructured industry data corpus, (b) filters the unstructured industry data corpus to the one or more targeted industries using the extracted names of all the entities identified in the unstructured industry data corpus, (c) extracts negative news related to the one or more targeted industries, and (d) feeds the negative news related to the one or more targeted industries into an industry news machine learning algorithm to produce the an unstructured data corpus industry score;
search structured data for financial and market data related to the targeted industries to generate structured industry data corpus;
feed the structured industry data corpus into an industry regression model to produce a structured data corpus industry score;

calculate an industry confidence score based upon the unstructured data corpus industry score and the structured data corpus industry score;

determine if the industry confidence score is greater than an industry confidence threshold;

feed, in response to the industry confidence score being larger than the industry confidence threshold, the unstructured industry data corpus into an entity news machine learning model that: (a) extracts the name of the targeted entity in the unstructured industry data corpus, (b) filters the unstructured industry data corpus to the target entity, (c) extracts negative news related to the target entity, and fees the negative news related to the target entity into an entity news machine learning algorithm to produce an unstructured data corpus entity score;

search, in response to the industry confidence score being greater than the industry confidence threshold, structured data for financial and market data related to the entity to generate structured entity data corpus;

feed the structured entity data corpus into an entity regression model to produce a structured data corpus entity score;

calculate, in response to the industry confidence score being greater than the industry confidence threshold, an entity confidence score for the targeted entity based upon the unstructured data corpus entity score and the structured data corpus entity score; and determine if the entity confidence score is larger than an entity confidence threshold; and generate, in response to the industry confidence score being larger than the industry confidence threshold and the entity confidence score being larger than the entity confidence threshold, one or more new alert reports for the targeted entity.

19. The non-transitory computer readable medium according to claim 18, further comprising instructions that, when executed by the at least one hardware processor, configure the at least one hardware processor to filter by one or more time periods the unstructured industry data corpus detected and extracted from the news feeds.

20. The non-transitory computer readable medium according to claim 18, further comprising instructions that, when executed by the at least one hardware processor, configure the processor to: calculate an industry negativity score for each article extracted from the negative news relating to the one or more target industries; filter the extracted negative news relating to the one or more target industries by at least one of a location group consisting of a geographic location, a geographic region, and combinations thereof to obtain extracted industry geographic negative news; feed the industry negativity score and the extracted industry geographic negative news into the industry new machine learning algorithm to produce the unstructured data corpus industry score; calculate an entity negativity score for each article extracted from the negative news relating to the target entity; filter the extracted negative news relating to the targeted entity by at least one of the location group to obtain extracted entity geographic negative news; and feed the entity negativity score and the extracted entity geographic negative news into the industry new machine learning algorithm to produce the unstructured data corpus entity score.

* * * * *